April 21, 1931.                R. M. GEYER ET AL                1,802,248
                              MOTION PICTURE APPARATUS
                           Filed Dec. 18, 1928    5 Sheets-Sheet 1
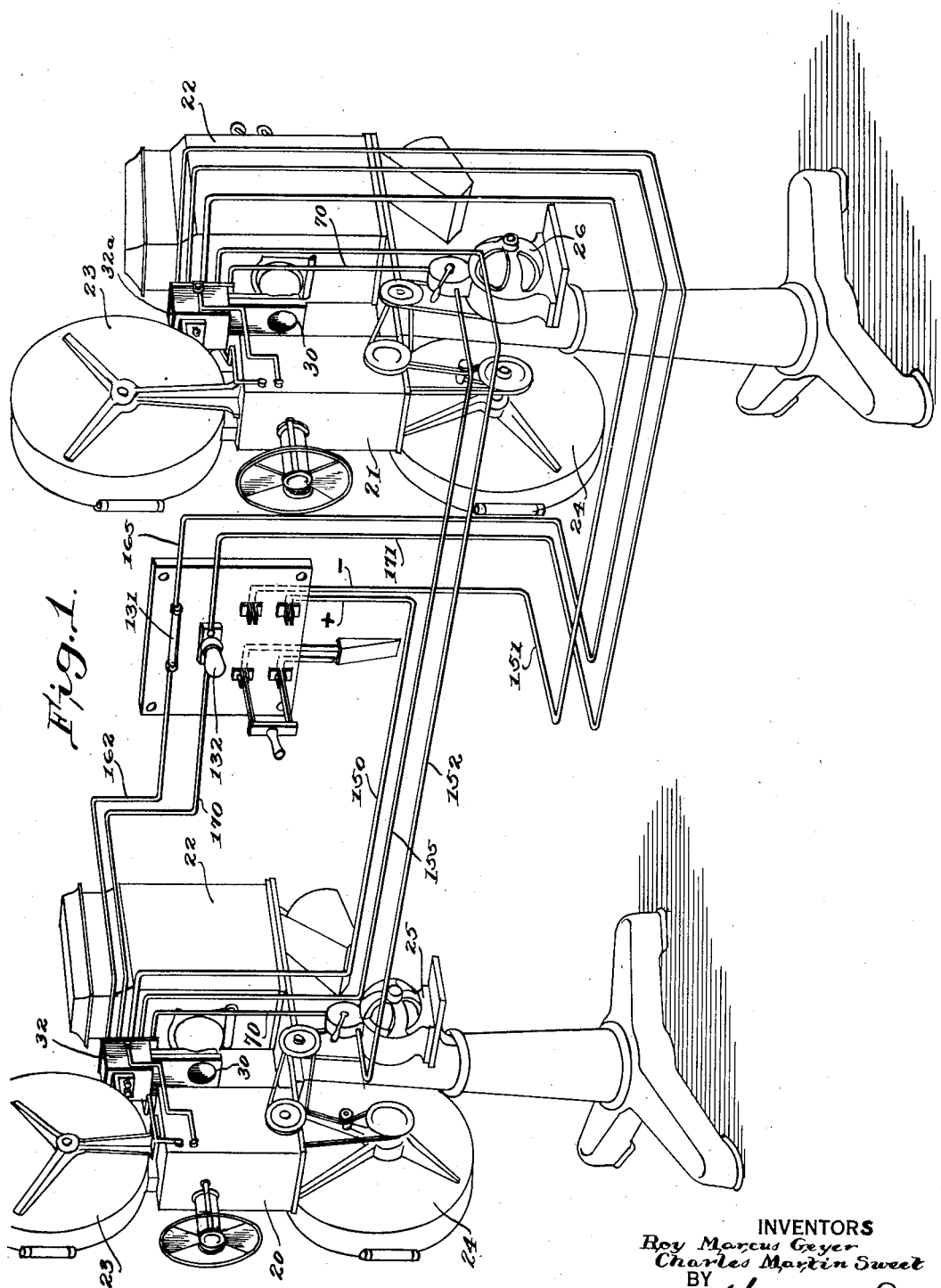
INVENTORS
Roy Marcus Geyer
Charles Martin Sweet
BY
ATTORNEY

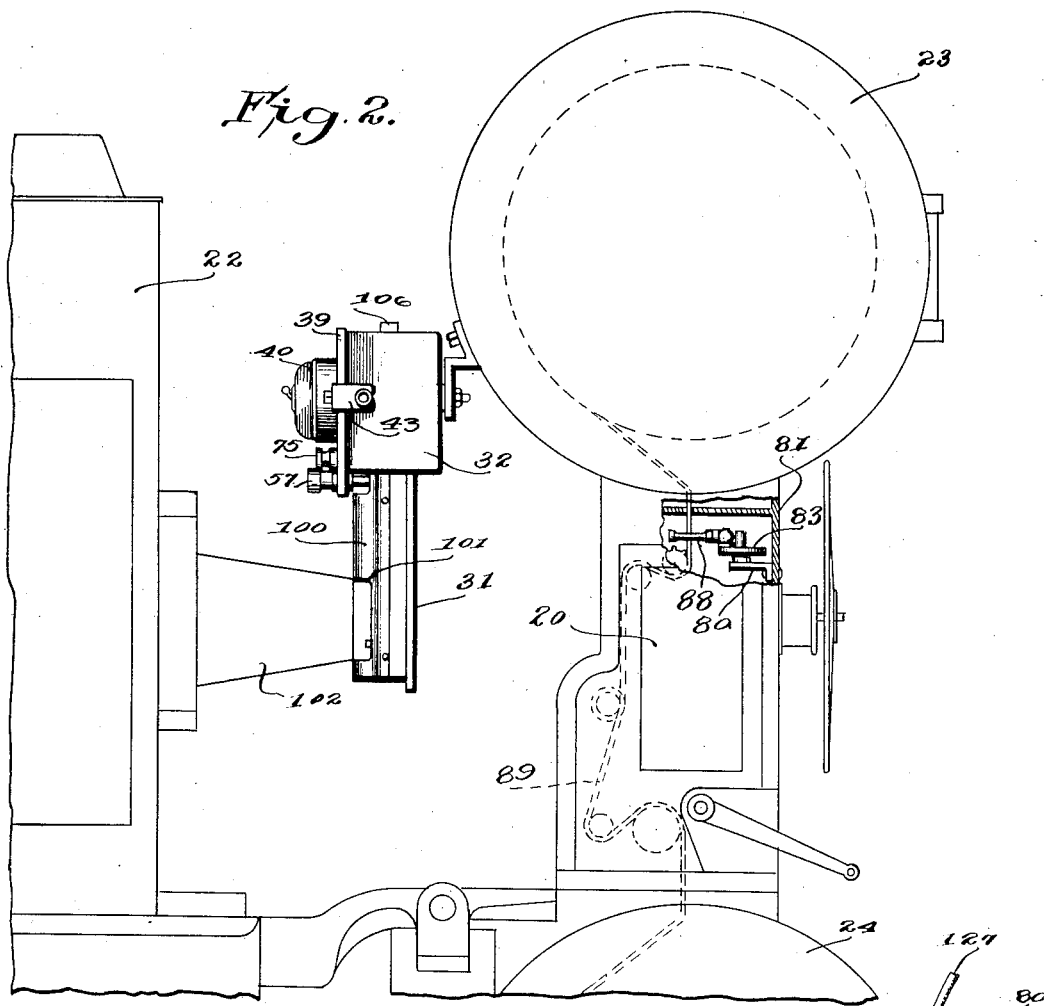

April 21, 1931.  R. M. GEYER ET AL  1,802,248
MOTION PICTURE APPARATUS
Filed Dec. 18, 1928  5 Sheets-Sheet 3
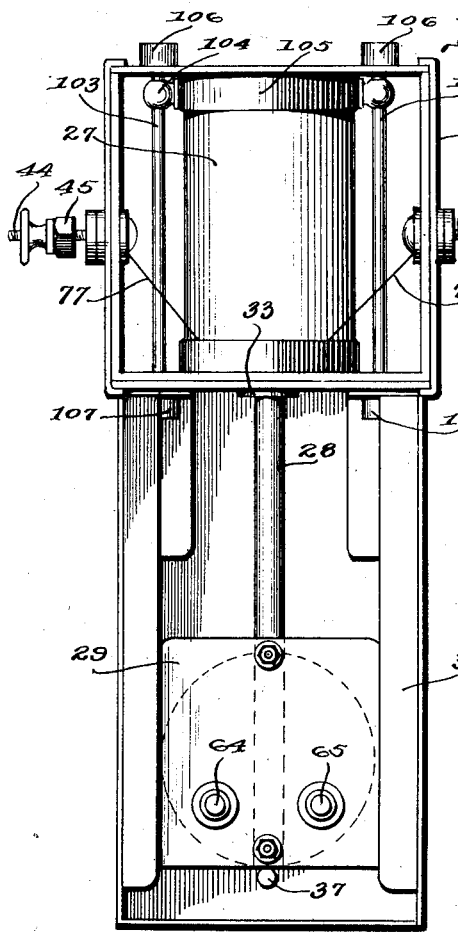
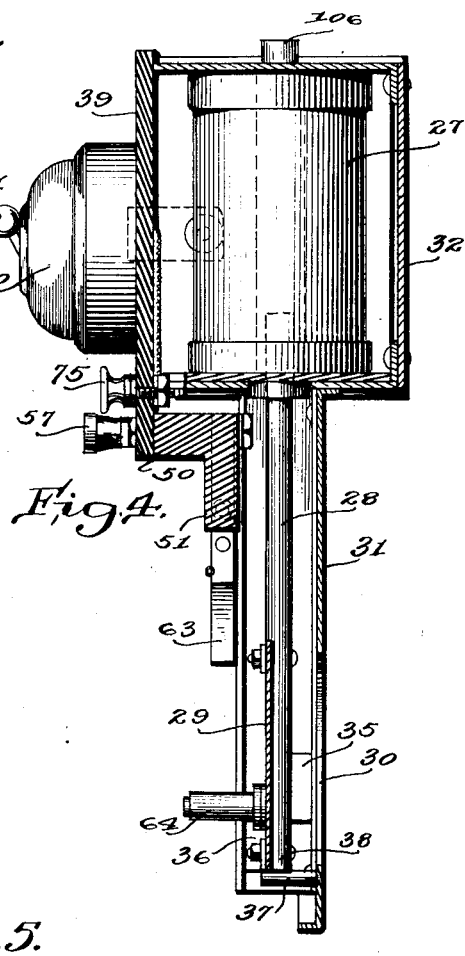
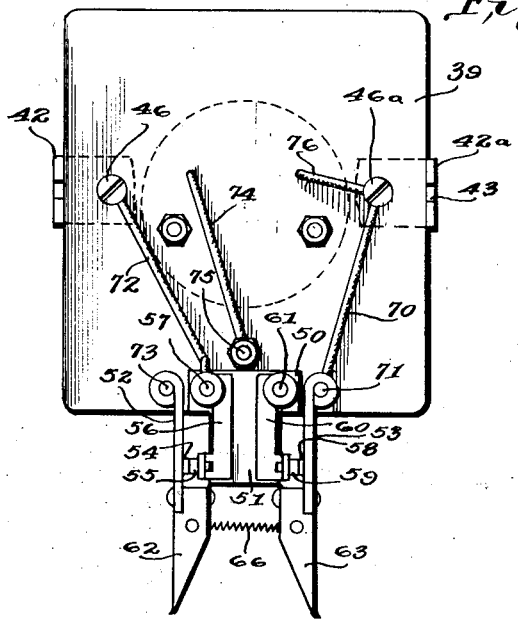
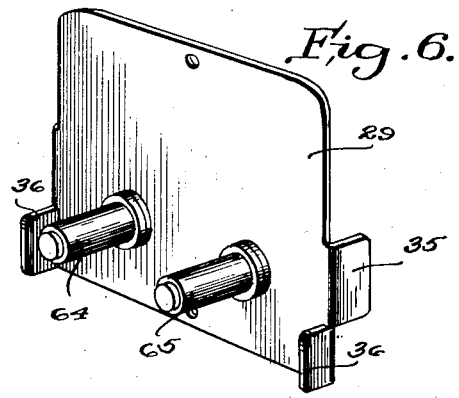
INVENTORS
Roy Marcus Geyer
Charles Martin Sweet
BY
ATTORNEY

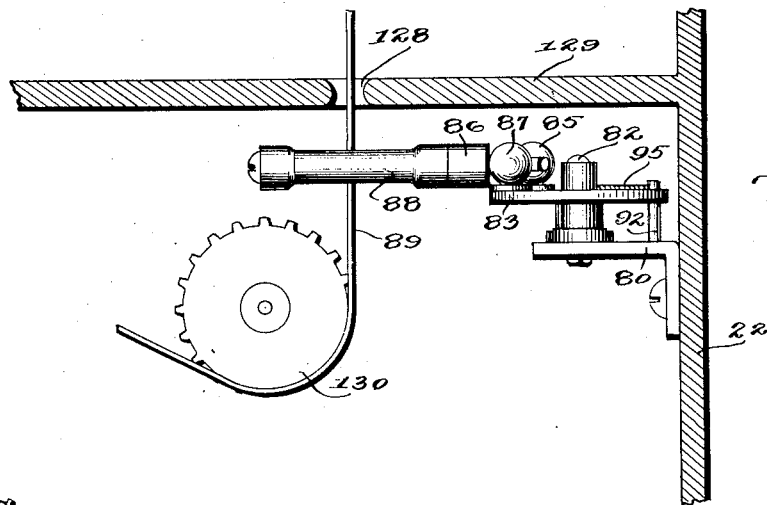
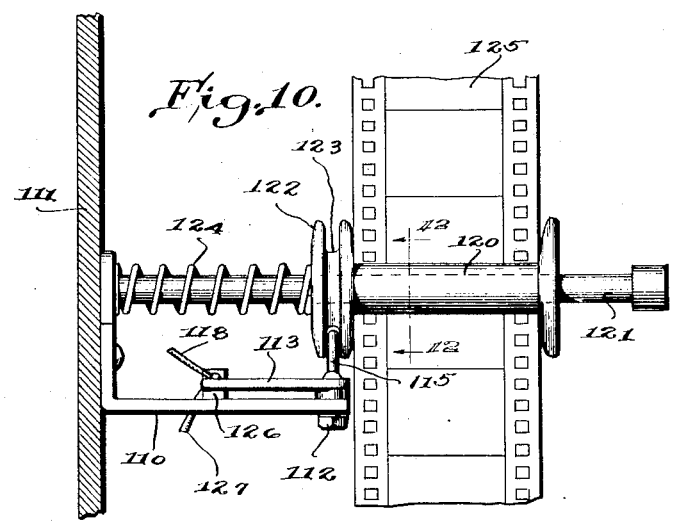
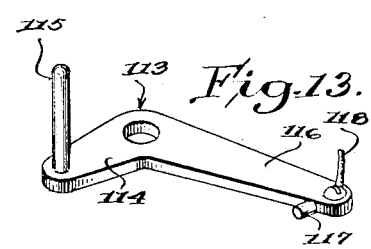
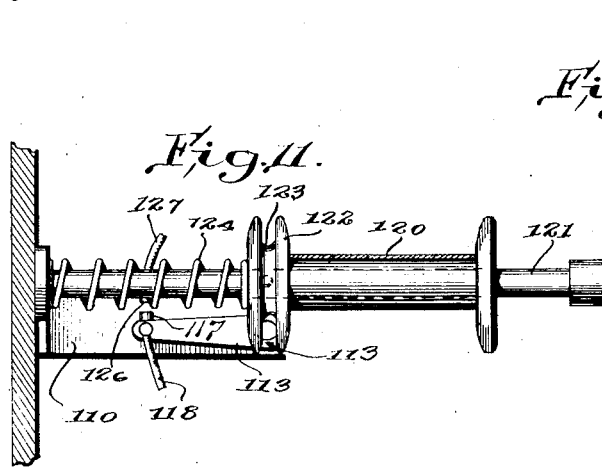
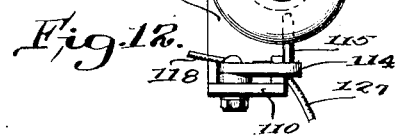
INVENTORS
Roy Marcus Geyer
Charles Martin Sweet
BY
ATTORNEY April 21, 1931.  R. M. GEYER ET AL  1,802,248
MOTION PICTURE APPARATUS
Filed Dec. 18, 1928   5 Sheets-Sheet 5
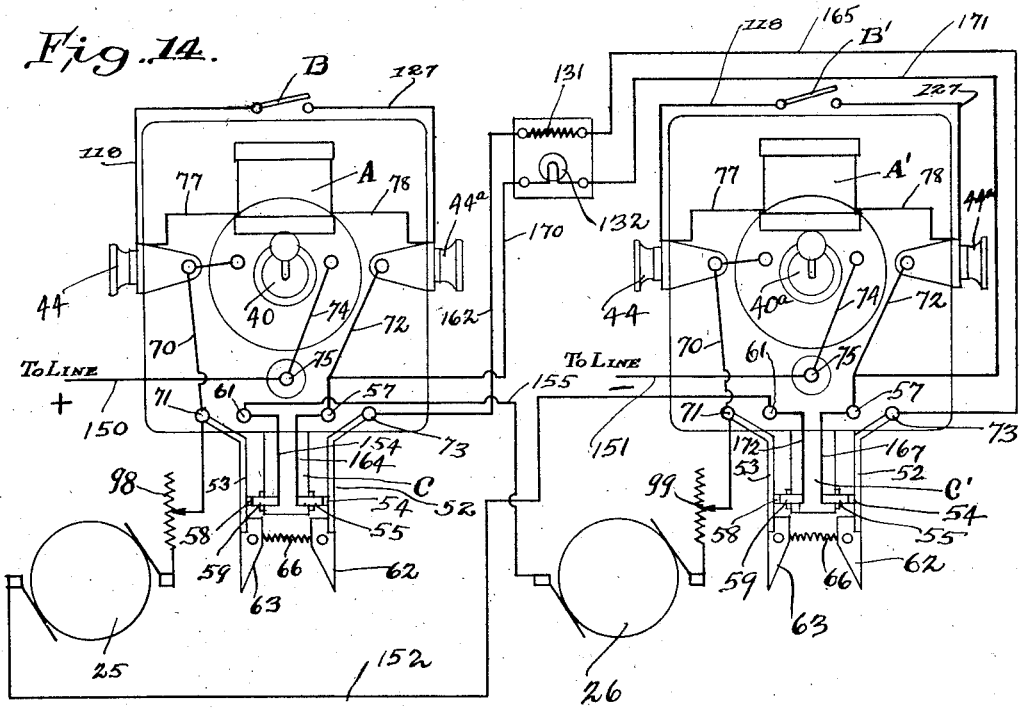
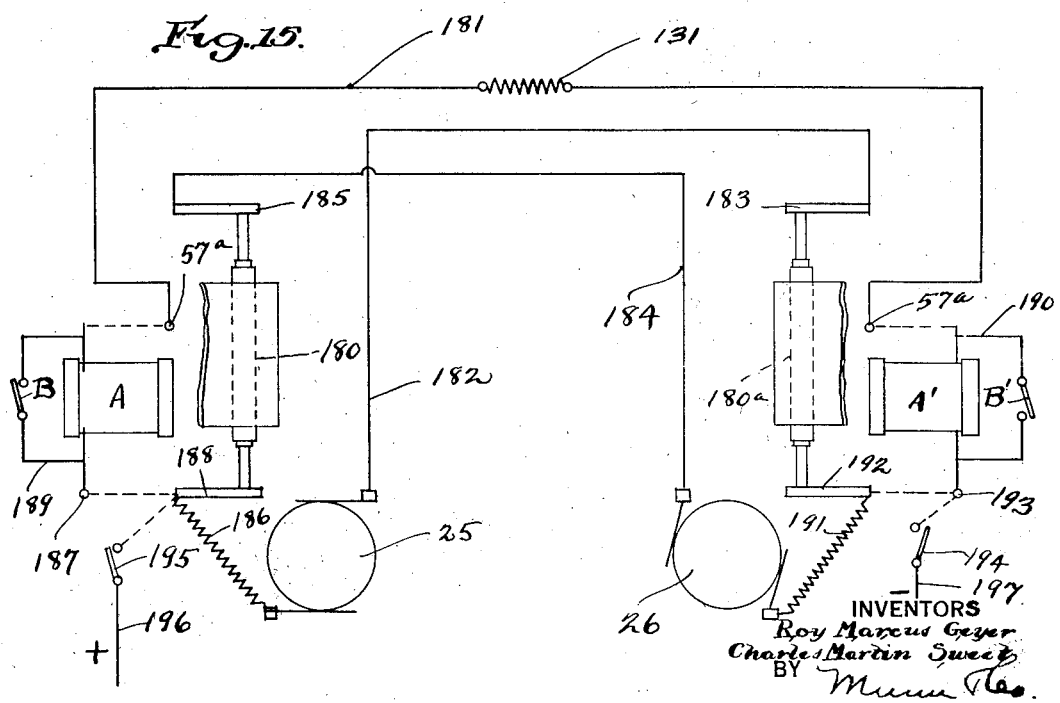
INVENTORS
Roy Marcus Geyer
Charles Martin Sweet
BY
ATTORNEY Patented Apr. 21, 1931

1,802,248

UNITED STATES PATENT OFFICE

ROY M. GEYER AND CHARLES M. SWEET, OF MUSSOORIE, INDIA

MOTION-PICTURE APPARATUS

Application filed December 18, 1928. Serial No. 326,900.

This invention relates to motion picture apparatus.

An object of the invention is the provision of a device for maintaining continuity of projection between successive reels of films in such a manner that the change over from one projection to another is automatically effected without any perceptible interruption.

Another object of the invention is the provision of a simple, compact arrangement adapted to be employed in conjunction with a plurality of motion picture projectors for screening a sequence of film reels without perceptible interruption in the projection between successive reels of films in which a pair of switches are automatically operated by a solenoid united with a metal plate which cuts off the light beams from the lamp houses when the solenoid is not actively energized, but which is clear of the path of light rays when the core of the solenoid is actuated.

A still further object of the invention is the provision of an arrangement coupled with a plurality of motion picture projectors for screening a sequence of film reels without perceptible interruption in the projection between successive reels of films, in which a movable contact arm controlling the circuit is maintained in a position for maintaining the circuit open through one of the units controlling the projectors, and retained in such position by an edge of a film.

Other objects of the invention include electric circuits for controlling a plurality of motion picture projectors for screening a sequence of film reels without perceptible interruption in the projection between successive reels of film, in which a plurality of resistances are employed for controlling the current to a plurality of solenoids which actuate shutters controlling the light beams of the projectors.

This invention will be best understood from a consideration of the following detailed description in connection with the accompanying drawings; nevertheless, it is to be understood that the invention is not confined to the disclosure, being susceptible of such changes and modifications as shall define no material departure from the salient features of the invention as expressed in the appended claims.

In the drawings:—

Figure 1 is a view in perspective of a plurality of projectors coupled together in accordance with the principles of my invention, Figure 2 is a side view in elevation of a projector showing a unit of the arrangement associated therewith, Figure 3 is a front view of an electrically controlled shutter for cutting off the light rays of a projector, Figure 4 is a longitudinal vertical section of the same, Figure 5 is a view in elevation of the switches associated with the device shown in Figs. 3 and 4 and removed from said device, Figure 6 is a view in perspective of a shutter shown in detached relation, Figure 7 is a view in perspective of a switch which is automatically controlled by an edge of a film, Figure 8 is a plan view of the switch shown in Fig. 7, Figure 9 is a fragmentary vertical section showing the switch of Fig. 7, disposed in operative relation with a film, Figure 10 is a fragmentary vertical section showing a modified form of the switch of Fig. 7, Figure 11 is a plan view of the switch shown in Fig. 10, Figure 12 is a vertical section taken along the line 12—12 of Fig. 10, Figure 13 is an enlarged view in perspective of the operating lever of the switch shown in Fig. 10, Figure 14 shows more or less diagrammatically the electric circuits of the arrangement for controlling a plurality of projectors.

Figure 15 is a modified form showing more or less diagrammatically the arrangement disclosed in Fig. 14.

Referring more particularly to the drawings, 20 and 21 designate a pair of projectors, each projector having a lamp house 22 and a projecting apparatus. Each projector is provided with an unwinding reel 23 and a winding reel 24. The reels of the projectors 20 are operated by a motor 25, while the reels of the projector 21 are operated by a motor 26.

Located in front of each projector is a solenoid consisting of a coil 27 and a core 28 which is reciprocated by the coil when energized and is connected to a shutter 29. This shutter is movable across an opening 30 formed in a plate 31 depending from a coil housing 32. A non-magnetic sleeve 33 is located axially of the coil and receives the core 28.

Shutter 29 is secured to the plunger 28 and maintained in position by gravity. The plate 31 has secured to its longitudinal edges guides 34 which receive oppositely disposed lugs 35 and 36 formed at the edges of the shutter 29 for guiding the shutter in its vertical movements. The lug 37 is secured to the front face of the plate 31 and is adapted to engage the lower end 38 of the plunger 28 for limiting the downward movement of the shutter and for maintaining the said shutter in closed position with respect to the opening 30. It will be noted from Fig. 2, that the unit just described is located in front of the lamp house 22 of the projector 20 and the shutter 29 is normally disposed across the light rays from the house, the light rays normally passing through the opening 30 when the shutter 29 is elevated and after the coil 27 has been energized with sufficient current to elevate the plunger 28.

A switch unit, as shown in Fig. 5, comprises a cover plate 39 removably connected to the outer face of the casing 32. The manually operable switch unit 40 having a spring pressed actuating switch member 41, is secured to the outer face of the cover plate 39. Angularly shaped metal members 42 are secured to the cover 39 and project inwardly from the plate and are provided with forks 43 adapted to receive threaded bolts 44 secured to the opposite side walls of the casing 32. Nuts 45 are threaded onto the bolts 44 for securing the members 42 to the casing 32 and likewise the cover 39. Contact members 46 and 46$^a$ respectively secure the members 42 and 42$^a$ to the cover 39.

A block of insulating material 50 is secured to the inner face of the cover 39 and has a laterally projecting flange 51. A pair of movable contact members 52 and 53 are movable towards or away from the sides of the flange 51. The contact member 52 has a contact point 54 adapted to engage a contact member 55 secured to a side edge of the flange 51. The contact 55 is connected by a metal member 56 with a binding post 57. The movable member 53 has a contact 58 adapted to engage a contact 59 supported by the flange 51 and connected with another member 60 to a binding post 61. A cam member 62 formed of insulating material is rigidly connected with the arm 52, while a cam member 63 also formed of insulating material is connected to the arm 53. The cam members 62 and 63 are adapted to be engaged respectively by rollers 64 and 65 mounted upon the shutter 29 for forcing the arms 52 and 53 apart, and thereby breaking the circuits through the disengagement of the contacts 54, 55 and 58, 59. A spring 66 connects the two cam members 62 and 63 together.

A wire 70 connects the contact member 46$^a$ with the post 71 on which the arm 53 is pivoted. A wire 72 connects the contact member 46 with the binding post 57. The arm 52 is pivoted on the post 73. A wire 74 connects a binding post 75 with an element of the switch unit 40.

A wire 76 connects the contact member 46$^a$ with the other element of the switch unit 40. A wire 77 connects one terminal of the coil 27 with the bolt 44, while a wire 78 connects the other terminal of said coil with a bolt 44$^a$. It will be noted that the unit just described, which is operated in connection with the projector 20 and its respective lamp house is duplicated in a similar position with respect to the lamp house of the projector 21, as shown at 32$^a$. Referring more particularly to Figs. 2, 7, 8, and 9 an automatic switch unit is illustrated which is carried by a bracket 80 secured to the housing 81 of the projector 20. This bracket carries an axle 82 on which is rotatably mounted a disc 83 having a contact arm 84 rigidly connected at 85 to the disc. A second arm or axle 86 is secured at 87 to the disc 83 and carries a roller 88 adapted to engage one edge of a moving film 89. The arm 84 is adapted to engage a contact member 90 secured to the bracket 80 and insulated, as shown at 91, from the bracket. A terminal 92 is secured to the bracket 80 and is insulated therefrom. A wire 93 connects the terminal 92 to the arm 84. The connection 85 is insulated, as shown at 94, from the plate 83. A spring 95 connects the disc 83 with a post 96 secured to the bracket 80 in such a manner that the disc will tend to rotate in the direction indicated by the arrow in Figs. 7 and 8, against the action of the film 89 on the roller 88. It will be noted that each projector is equipped with an automatic switching element as indicated at B and B′ in Fig. 14, which are respectively connected in circuit with the coils A and A′ and the switching elements C and C′ and likewise the motors 25 and 26. The current to the motor 25 is controlled by the resistance indicated at 98, while motor 26 is controlled through the resistance 99. A cover 100 is slidably mounted on the flanges of the plate 31 and is provided with an opening 101 adapted to be aligned with a tube 102 connected with the lamp house 22, and is adapted to have its upper end in engagement with the bottom of the casing 32. Bolts 103 pass through the casing 32 upon opposite sides of the coil 27 and pass through the ends 104 of the bracket 105 supporting the upper end of the coil 27. Nuts 106 secure the outer ends of the bolts 103 in position. Nuts 107 secure the opposite ends of the bolts to the bottom of the casing 32.

A modified form of the automatic switch arrangement is shown in Figs. 10 to 13 inclusive. In this form a bracket 110 is secured to a side wall 111 of a projector and is provided with a pivot 112 for a bell crank lever 113 which has a short arm 114 carrying a pin 115, and a long arm 116 carrying a a contact member 117. The contact member 117 is connected to a wire 118 for a purpose which will be presently explained.

A roller 120 is slidably mounted on a rod 121 fixed to the bracket 110. This roller has a flange 122 provided with a groove 123 receiving the pin 115. A spring 124 embracing the rod 121 has one end engaging the bracket 110 and the other end engaging the flange 122 tending to force the roller in the direction indicated by the arrow in Fig. 10, against the action of the film 125. As long as the film is maintained taut, and an edge is in engagement with the flange 122, the roller 120 will be retained in such a position, and the lever 113 of the contact 117 will be maintained out of engagement with the contact 126 connected to a wire 127.

The roller 120 and the roller 88 are located adjacent a slot 128 which is formed in a wall 129 located between the projector 22 and the unwinding reel casing 23. The roller is disposed between the said slot and a toothed wheel 130 which is revolved for withdrawing the film from the unwinding reel.

Referring more particularly to Figs. 1 to 14, it will be noted that a wiring diagram is disclosed indicating the electric circuits of the invention. The wiring is arranged in three circuits, two of which include the motors 25 and 26 and their speed regulators 98, and 99, and the third includes the solenoids of the units A and A', and the controlling resistances 131 and 132. The unit 132 is a high resistance in the form of a lamp, while the resistance 131 is of a low type. Both the motor circuits are identical. The coils of the solenoids are in series with the resistance 132. The resistance 131 serves a double purpose. It is placed in parallel with the resistance 132 when the plunger 28 of both units, A and A' is not drawn upwardly by its respective coil, but is cut out of the circuit as soon as the shutter 29 in one of these units is drawn up and opens the respective switch C or C' the contacts of which are connected to the terminals or binding posts 57 and 73. The secondary purpose of the resistance 131 is to prevent any dead short circuits. If the wires connecting the terminals 73 are not in circuit with the low resistance 131 both switch elements B and B' are closed, as for example, when neither projector is threaded with a film and the switch units 40 and 40ª are closed, a short circuit would be the result. The purpose of the high resistance 132 prevents the coil of the solenoid from overheating. The wiring diagram of the circuit is as follows:

In order to place the motor 25 in circuit it is necessary to close switches 40 and 40ª which are inserted in the main lines designated by the numerals 150 and 151, through the wires 70, resistance 98, motor 25, wire 152, contacts 58, 59 of the switch element C', wires 70 which are connected with the switch element 40ª of the projector 21, the switch element 40ª, wires 74 and 151. It will be noted that in order to close the circuit to the motor 25, both switch elements 40 and 40ª must be closed. The circuit just described controls the motor 25.

In order to place the motor 26 in circuit it is necessary also to close the switches 40 and 40ª so that current from the line 150 will pass through the switch element 40, wire 70, arm 53, contacts 58 and 59 of the switch element C, wire 154, wire 155, motor 26, resistance 99, wire 70, switch element 40ª and to the line indicated by the numeral 151. It will be appreciated, however, that when the motor 25 is in circuit, a shutter 29 associated with the projector 20 has been moved upwardly thereby forcing the cam members 62 and 63 apart, thus breaking the contacts 58, 59, and 54, 55. On the other hand when the motor 26 is in circuit, the shutter just described will be in its lowered position, permitting the cam members 62 and 63 to be returned to their normal positions by the spring 66 and permitting the respective contacts just mentioned to return to their normal engaging relation. When the motor 26 is in circuit the shutter 29 associated with the projector 21 will have been moved upwardly forcing the cam members 62 and 63 of the switch element C' apart thereby opening the circuit to the motor 25. The circuit to the motor 26 is broken when the contacts 58, 59 are separated by the action of the roller 64 of the shutter 29, associated with the switch C.

The switches B and B' are shunted across the terminals 44 and 44ª by wires 118 and 127. Resistance 131 is connected by means of a wire 162 with the terminal or binding post 73, contacts 54 and 55, wires 164 and 72, to the binding post 44ª, and therefore with the coil A. This resistance is also connected with the binding post 44ª and the coil A' by means of a wire 165, binding post 73, contacts 54, 55 of the switch C', wires 167, and 72. The resistance 132 is connected by means of a wire 170, to the binding posts 57 and 44ª and by means of the contacts 54, 55 of the switch C and wire 162 to the resistance 131. A similar circuit is shown whereby the resistance 132 is controlled through the contacts 54, 55 of the switch C' of the unit connected with the projector 21. The connections include a wire 171.

The operation of our device is as follows: The two projectors are placed side by side, as shown in Fig. 1, and the units A, A'; B, B'; and C, C'; and the motors 25, 26 together with the resistances 131, 132 are electrically connected in accordance with the diagram shown in Fig. 14. It must be borne in mind that the units indicated by the letters A, B, and C are associated with the projector 20, while the units A', B', and C' are associated with the projector 21. The projector 21 is fitted with the first of a sequence of reels and in threading the film between the reels 23 and 24 of the projector 21, an edge of the film is caused to rest against the roller 88 of the projector 21, so that the arm is held in an inoperative position for maintaining the switch B' open, and until the end of the film runs past the arm 88 to release the same. A second reel may be threaded on the projector 20 at any time prior to the release of the end of the first reel on the projector 21. If, however, the second reel is not threaded on the projector 20, the switch B of this projector is closed. Upon closing of the switches 40 and 40ª current passes through both motors 25 and 26 and their speed regulators 98 and 99 respectively, and also through both resistances 131 and 132, but only through one of the solenoids, that is the solenoid A' of the projector 21. The solenoid A of the projector 20 is shorted, due to the fact that the film has not been threaded to maintain the switch B open.

In order that a solenoid be energized sufficiently to operate a plunger 28 and likewise its united shutter 29, the other solenoid must be shorted and both resistances 131 and 132 must be in circuit. However, as soon as the shutter 29 of the projector 21 is elevated, very little current is required to maintain the shutter and the plunger in an upward position. As soon as the shutter 29 of the projector 21 is elevated, light beams from its respective lamp house pass through the opening and through the film so that the screening of the first reel of the film of the projector 21 is commenced.

As soon as the shutter 29 of the projector 21 is elevated the cam members 62 and 63 of the switch C and C' are forced apart, separating the contacts 54, 55 connected with the terminals 57 and 73, whereupon the motor 25 of the projector 20 is cut out of circuit, and the low resistance 131 is cut out. During the screening of the first reel on the projector 21, a second reel is threaded on the projector 20 and in so doing switch B of this projector is opened and retained open by the film. Although this allows the current to pass through the solenoid A the circuit will not be strong enough to energize this solenoid sufficiently to cause it to actuate its plunger and raise the shutter 29 of the projector 20 due to the fact that the current must pass through both solenoids and the high resistance 132, the low resistance 131 not being in circuit.

When the end of the film on the projector 21 releases the arm 88 of the switch B' thereby closing said switch, the coil of the solenoid A' is shorted and thus deenergizing permitting the plunger to fall by gravity and to cause the shutter 29 to close the opening 30 of the projector 21, thus preventing any further light passing through the projector. The rollers 64 and 65 release the cam members 62 and 63, respectively, causing the contacts 58, 59 and 54, 55 to become reengaged so that the current will pass through the motor 25 and its speed regulator 98, of the projector 20 through the contacts 58 and 59. At the same time the low resistance 131 is thrown into parallel with the high resistance 132 through the contacts 54, 55, thus allowing sufficient current to pass through the solenoid A of the projector 20 to enable said solenoid to cause the plunger associated therewith to be drawn upwardly and likewise the shutter 29. The projector 20 is now operating for screening the film. As soon as shutter 29 is drawn upwardly, the rollers 64 and 65 will engage the cam members 62 and 63, respectively, of the switch C breaking certain of the circuits through the opening of the contacts 54, 55 and 58, 59 thereby cutting off the motor 26 of the projector 21 and the low resistance 131. The third reel is then threaded on the projector 21 so that when the end of the film on the projector 20 releases the arm 88 of the automatic switch B, the projection will again change over to the projector 21 in the manner just described. The intervals between the cutting off of one projection and the continuation of the projection on the other projector is so very brief that a continuous projection between the two projectors is maintained at all times. The circuits are not only arranged symmetrically but sparking in the solenoid circuits is considerably reduced due to the fact that the solenoids are connected in series.

If desired the high resistance 132 may be dispensed with and in this case the wires 162, 165 connecting the terminals 73 of the automatic switches C and C' through the low resistance 131 will be eliminated in the modified arrangement. The switches C and C' may each be converted quite readily into a double break switch in which the swinging arms 52 and 53 would form the contacts and the links 56 and 60 will be removed and contacts 54 and 58 will be connected by a link, as shown at 180, in dotted lines in Fig. 15. The wire 131 connects the two terminals 57ª with the low resistance 131 and a wire 182 is connected between the motor 25 and an arm 183, while a wire 184 connects the motor 26 with an arm 185, and a resistance 186 placed between the motor 25, and a contact 187, also the arm 188. The switch B is shunted by the wire 189 around the coil A, which arrangement is also true of the wiring diagram associated with the motor 26, and the coil A'. The wire 190 shunts the switch B' around the coil A' and the resistance 191 is placed between the motor 26 and arm 192. Switches 194 and 195 are similar to the switches 40 and 40ª shown on Fig. 14.

The modifications in the wiring diagram shown in Fig. 15, dispenses with the high resistance and the arrangement is simplified and will be as flexible and efficient in operation as the arrangement shown in Fig. 14, provided, however, the operator takes the precaution of rethreading a projector as soon as it has run off its reel, thereby allowing the current to pass through both solenoids all the time, except during the brief period when a projector is not threaded. During the screening of the last of the sequence of reels, switch B or B', of whatever projector is idle, may be retained open by any suitable means well known in the art. These precautions may be obviated by providing coils for the solenoids so designed that should one coil only be in circuit during the screening of a complete reel of film, it will not overheat. Another method employed would be the conversion of switch B or B' into a momentary action switch which would be closed only during the actual operation of the change over from one projector to another.

In order to complete the utility of the invention, the shutter 29 may be adapted to act as an auxiliary to the automatic safety shutter of a projector and to function in a similar manner under like circumstances by the addition of a unit comprising a centrifugal governor fitted to each projector and adapted to operate a switch connected to the terminals 44 and 44ª of each unit, the governor being driven directly or through belts.

If desirable a push button on each of the units A and A' may be connected to the terminals 44 and 44ª and which may be fitted adjacent the switches 40 and 40ª. Such push buttons will enable the change over from one projector to another to be effected at any time before the end of the reel.

If it is required to stop the projection at any time it will only be necessary to open one of the switches 40 or 40ª.

I claim:—

1. An arrangement for controlling the operation of a plurality of projectors in sequence comprising a pair of motor circuits, a switch in each circuit, a magnetic means adapted when energized to control the operation of a switch, a second switch shunted across the terminals of each magnetic means, one of the second switches being retained in open position by a film, a shutter normally closed by gravity but moved to open position by the magnetic means when energized, and for causing opening of the first mentioned switch and breaking one of the motor circuits, and a resistance adapted to be placed in circuit with a magnetic means by the first mentioned switch, and preventing energization of said magnetic means to prevent opening of a shutter connected with said means, the switches associated with one projector being adapted to control the circuits associated with the other projector.

2. An arrangement for controlling the operation of a plurality of projectors in sequence comprising a pair of motor circuits, a shutter associated with each projector for cutting off the light from the projector, a magnetic means for controlling the operation of the shutter, a switch shunted across the terminals of each magnetic means, one of the switches retained in open position by a film, one of the switches being closed when the film is released, so that the magnetic means associated with one of the projectors will be deenergized to allow closing of the shutter, a switch operatively associated with one projecting being adapted to control the circuits associated with the other projector.

3. An arrangement for controlling the operation of a plurality of projectors in sequence comprising a pair of motor circuits, a shutter associated with each projector for cutting off the light from the projector, a magnetic means for controlling the operation of the shutter, spring actuated switch shunted across the terminals of each magnetic means and retained in open position by a film, said switch being closed when the film is released, so that the magnetic means associated with one of the projectors will be deenergized to allow closing of the shutter, a resistance adapted to be placed in circuit with the magnetic means when its respective shutter is closed to allow said magnetic means to open the shutter, the resistance being placed in circuit with the magnetic means to prevent energization of said magnetic means to prevent opening of a shutter connected with said means, a switch operatively associated with one of the projectors being adapted to control the circuit associated with the other projector.

4. An arrangement for controlling the operation of a plurality of projectors in sequence comprising a pair of motor circuits, a shutter associated with each projector for cutting off the light from the projector, a magnetic means for controlling the operation of the shutter, a spring actuated switch shunted across the terminals of each magnetic means and retained in open position by a film, said switch being closed when the film is released, so that the magnetic means associated with one of the projectors will be deenergized to allow closing of the shutter, a resistance adapted to be placed in circuit with a magnetic means when its respective shutter is closed to allow said magnetic means to open the shutter, a second resistance cooperating with the first resistance and adapted to be placed in circuit with said magnetic means for reducing the current to the magnetic means to prevent actuation of the shutter, a switch operatively associated with one projector being adapted to control the circuits associated with the other projector for placing resistances in circuit with one of the magnetic means.

5. An arrangement for controlling the operation of a plurality of projectors in sequence comprising a pair of motor circuits, a switch in each circuit, a magnetic means adapted when energized to control the operation of a switch, a spring actuated switch shunted across the terminals of each magnetic means and adapted to be retained in open position by moving film of a projection apparatus, and when closed causing short circuiting of a magnetic means, a shutter actuated to open position by a magnetic means when energized and for opening one of the first mentioned switches, and cutting off current to one of the motors, and a low resistance and high resistance connected in circuit and in parallel with the magnetic means, adapted to reduce the current to one of the magnetic means for preventing the magnetic means from actuating an automatic switch in circuit with said magnetic means, a spring actuated switch associated with one of the motors being adapted to place resistances in circuit with the magnetic means associated with the other projector.

6. An arrangement for controlling the operation of a plurality of projectors in sequence comprising a pair of motor circuits, a switch in each circuit, a magnetic means, a plunger actuated by the magnetic means when energized, said switch in each circuit adapted to be moved to open position by the plunger, a film, a switch having an arm engaged by the film and maintaining said switch in open position, a switch being shunted across the terminals of each magnetic means, a shutter connected with the plunger and adapted to be moved to open position when the magnetic means is energized and for causing opening of the first mentioned switch and opening of one of the motor circuits, the switches associated with one projector being adapted to control the circuits associated with the magnetic means and the motor of the other projector.

7. An arrangement for controlling the operation of a plurality of projectors in sequence comprising a pair of motor circuits, a switch in each circuit, a magnetic means, a plunger actuated by the magnetic means when energized, said switch in each circuit adapted to be moved to open position by a plunger, a film, a switch having an arm engaged by the film and maintaining said switch in open position, a switch being shunted across the terminals of each magnetic means, a shutter connected with the plunger and adapted to be moved to open position when the magnetic means is energized and for causing opening of the first mentioned switch and opening of one of the motor circuits, and a resistance adapted to be placed in circuit with the magnetic means and controlled by the first mentioned switch, one of the first-mentioned switches associated with its respective projector being adapted to place a resistance in circuit with the magnetic means associated with the other projector, the switches associated with one projector being adapted to control the circuits associated with the magnetic means and the motor of the other projector.

8. An arrangement for controlling the operation of a plurality of projectors in sequence comprising a pair of motor circuits, a switch in each circuit, a magnetic means, a plunger actuated by the magnetic means when energized, said switch in each circuit adapted to be moved to open position by a plunger, a film, a switch having an arm engaged by the film and maintaining said switch in open position, a switch being shunted across the terminals of each magnetic means, a shutter connected with the plunger and adapted to be moved to open position when the magnetic means is energized and for causing opening of the first mentioned switch and opening of one of the motor circuits, and a resistance adapted to be placed in circuit with the magnetic means and controlled by the first mentioned switch, a second resistance adapted to be in circuit with the magnetic means and cooperating with the first resistance for reducing the current to the magnetic means and preventing operation of the plunger and likewise the shutter, one of the first-mentioned switches associated with one projector being adapted to place the resistances in circuit with the magnetic means associated with the other projector, the other switches associated with one projector being adapted to control the circuits which includes the motor in the magnetic means of the other projector.

ROY M. GEYER.
CHARLES M. SWEET.